United States Patent
Lee (10) Patent No.: US 7,637,025 B2
(45) Date of Patent: Dec. 29, 2009

(54) APPARATUS FOR MEASURING THICKNESS OF LENS

(75) Inventor: Chun-Yu Lee, Taipei-Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/122,534

(22) Filed: May 16, 2008

(65) Prior Publication Data

US 2009/0038169 A1  Feb. 12, 2009

(30) Foreign Application Priority Data

Aug. 10, 2007 (CN) .................. 2007 1 0201329

(51) Int. Cl.
*G01B 5/213* (2006.01)
*G01B 5/02* (2006.01)

(52) U.S. Cl. .................................. 33/507; 33/783

(58) Field of Classification Search .............. 33/1 BB, 33/200, 507, 783, 784
See application file for complete search history.

(56) References Cited

U.S. PATENT DOCUMENTS

| | | | |
|---|---|---|---|
| 1,532,878 A * | 4/1925 | Bugbee ..................... 33/507 |
| 3,002,285 A * | 10/1961 | Wright ..................... 33/507 |
| 3,046,668 A * | 7/1962 | Salvatori ................... 33/507 |
| 4,078,418 A * | 3/1978 | Rips et al. ................. 33/507 |
| 4,229,911 A * | 10/1980 | Bicskei ..................... 33/507 |
| 4,573,270 A * | 3/1986 | D'Amico ................... 33/783 |
| 4,727,654 A * | 3/1988 | Cingone ................... 33/507 |
| 6,473,987 B1 * | 11/2002 | Steere et al. .............. 33/783 |
| 6,728,656 B2 * | 4/2004 | Suzuki ..................... 33/200 |
| 2004/0016136 A1 * | 1/2004 | Igarashi et al. ........... 33/200 |
| 2007/0193043 A1 * | 8/2007 | Katzman ................... 33/200 |

* cited by examiner

*Primary Examiner*—G. Bradley Bennett
(74) *Attorney, Agent, or Firm*—Andrew C. Cheng (57) ABSTRACT

An apparatus for measuring a thickness of a lens includes a plurality of first touch heads, a base, a plurality of second touch heads and a driving mechanism. The first touch heads each has a first curved contact surface for coming into contact with a first surface of the lens. The first curved contact surfaces have different curvatures for being selectively mated with the first surface of the lens. The base is configured for selectively mounting one of the first touch heads thereon. The second touch heads each has a second curved contact surface for coming into contact with a second surface of the lens. The second curved contact surfaces have different curvatures for being selectively mated with the second surface of the lens. The driving mechanism is configured for driving the mounted second touch head to move relative to the mounted first touch head.

7 Claims, 7 Drawing Sheets

APPARATUS FOR MEASURING THICKNESS OF LENS

BACKGROUND

1. Technical Field

The present invention relates to measuring tools and, particularly, to an apparatus for measuring a thickness of a lens.

2. Description of Related Art

With the development of optical imaging technology, camera devices, such as digital cameras and mobile phones, are widely used in electronic devices. Optical lenses are one of the most critical components in any camera device.

Typically, optical lenses are made by an injection molding process. After the injection molding process, a thickness of the lens needs to be measured by an apparatus (see "A Novel Optical Method of Dimension Measurement of Objects with Circular Cross-section", Instrumentation and Measurement Technology Conference, 2006).

Figure 6:
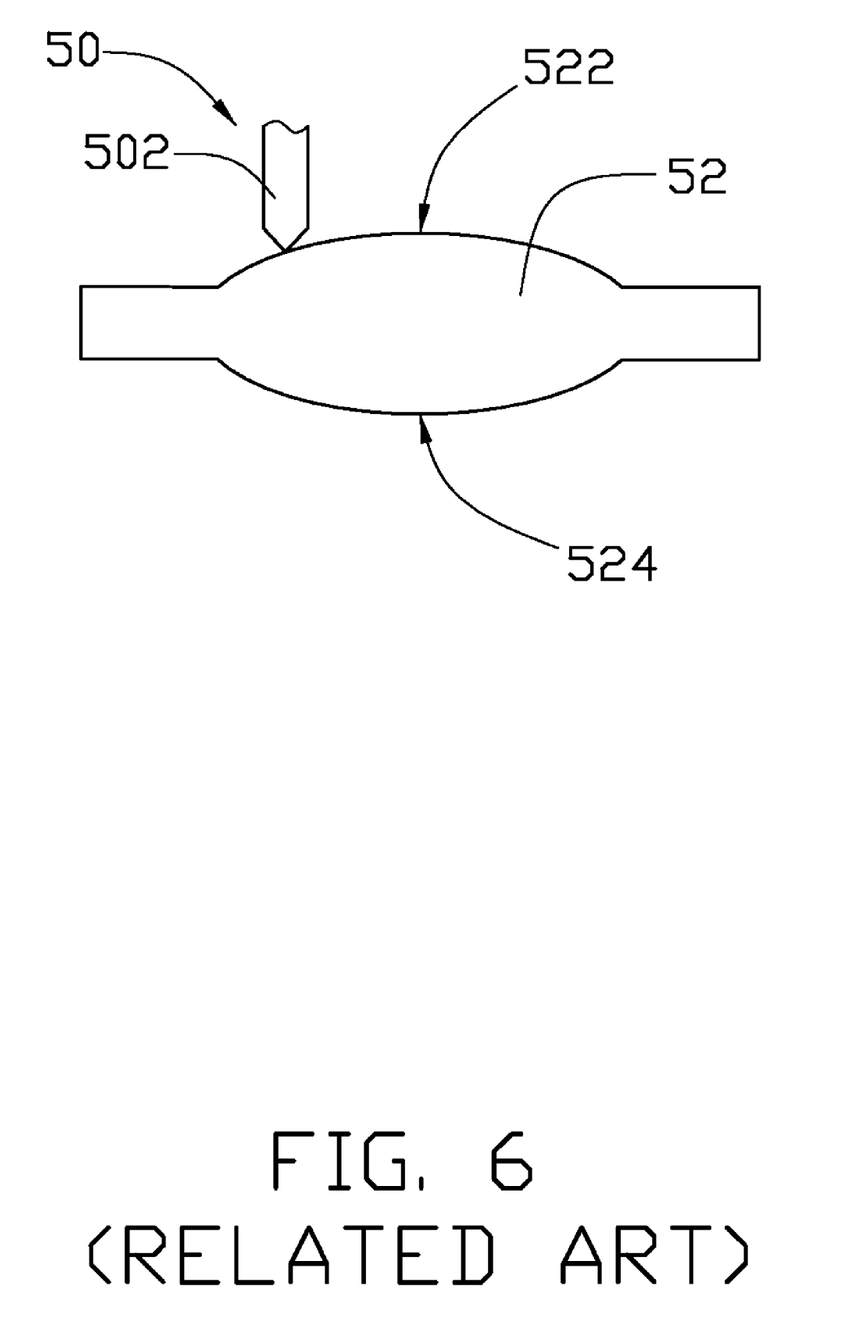
FIG. 6 is a surface profile meter for measuring a thickness of a lens in accordance with a conventional technology.

Referring to FIG. 6, a surface profile meter 50 used for measuring a thickness of a lens 52 is illustrated. The surface profile meter 50 includes a probe 502. The lens 52 has two surfaces 522 and 524 facing away from each other. The thickness of the lens 52 is usually taken as the greatest distance between generally central peak points of each of the two surfaces 522 and 524. The probe 502 is driven to touch and slide on the surface 522 until the peak point of the surface 522 is detected by the surface profile meter 50 and the same is done for the other surface 524. Unfortunately, the surface profile meter 50 is very expensive, and may give inaccurate results if orientation of the lens is not correct or bending of the lens occurs.

Figure 7:
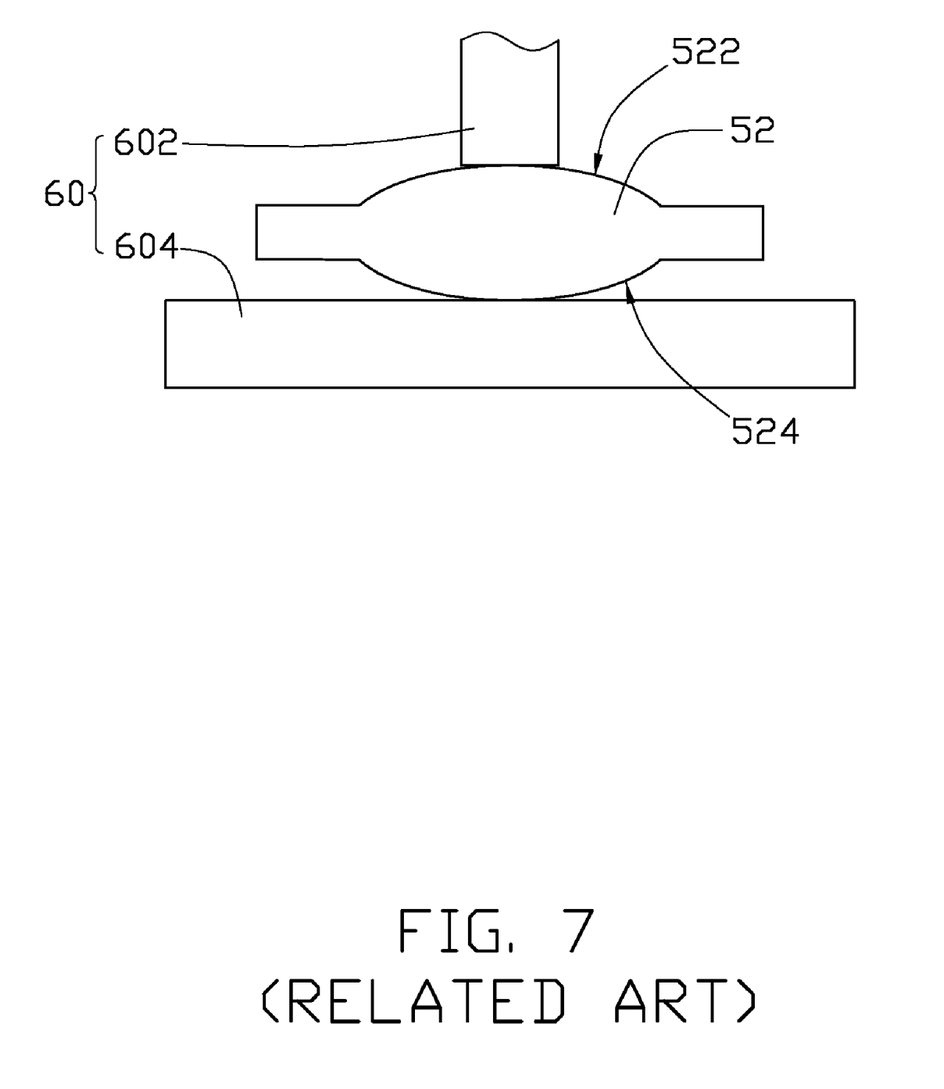
FIG. 7 is a height gauge for measuring a thickness of a lens in accordance with another conventional technology.

Referring to FIG. 7, a height gauge 60 for measuring the thickness of the lens 52 is illustrated in accordance with a conventional technology. The height gauge 60 includes a touch head 602 and a base 604. In use, the lens 52 is disposed on the base 604 with the surface 524 touching a surface of the base 604. Then, one end of the touch head 602 touches the surface 522. A distance between the end of the touch head 602 and the surface of the base 604 is a thickness of the lens 52.

The height gauge 60 is much cheaper than the surface profile meter 50. However, the surface of the base 604 and the end face of the touch head 602 are both plane, which may result in tilting of an optical axis of the lens 52 with respect to a vertical line of the surface of the base 604, and thus errors may occur. Besides, contact faces between the surface 522 and the end face of the touch head 602 and between the surface 524 and the surface of the base 604 are small, which may result in the lens 52 distorting, and thus decreasing the measuring precision of the lens 52.

What is needed, therefore, is an apparatus for measuring a thickness of a lens with higher precision.

SUMMARY

In a present embodiment, an apparatus for measuring a thickness of a lens is provided. The lens has a first surface and a second surface facing away from the first surface. The apparatus includes a plurality of first touch heads, a base, a plurality of second touch heads and a driving mechanism. The plurality of first touch heads each has a first curved contact surface for coming into contact with the first surface of the lens. The first curved contact surfaces of the first touch heads have different curvatures for being selectively mated with the first surface of the lens. The base is configured for selectively mounting one of the first touch heads thereon. The plurality of second touch heads each has a second curved contact surface for coming into contact with the second surface of the lens. The second curved contact surfaces of the second touch heads have different curvatures for being selectively mated with the second surface of the lens. The driving mechanism selectively mounts one of the second touch heads thereon. The driving mechanism is configured for driving the mounted second touch head to move relative to the mounted first touch head. The second curved contact surface of the mounted second touch head faces toward the first curved contact surface of the mounted first touch head.

Other advantages and novel features of the present invention will become more apparent from the following detailed description of present embodiment when taken in conjunction with the accompanying drawings.

BRIEF DESCRIPTION OF THE DRAWINGS

Many aspects of the present apparatus for measuring a thickness of a lens can be better understood with reference to the following drawings. The components in the drawing are not necessarily drawn to scale, the emphasis instead being placed upon clearly illustrating the principles of the present apparatus for measuring a thickness of a lens. Moreover, in the drawings, like reference numerals designate corresponding parts throughout the several views.

DETAILED DESCRIPTION OF THE PRESENT EMBODIMENTS

Embodiments of the present apparatus for measuring a thickness of a lens will now be described in detail below and with reference to the drawings.

Figure 1:
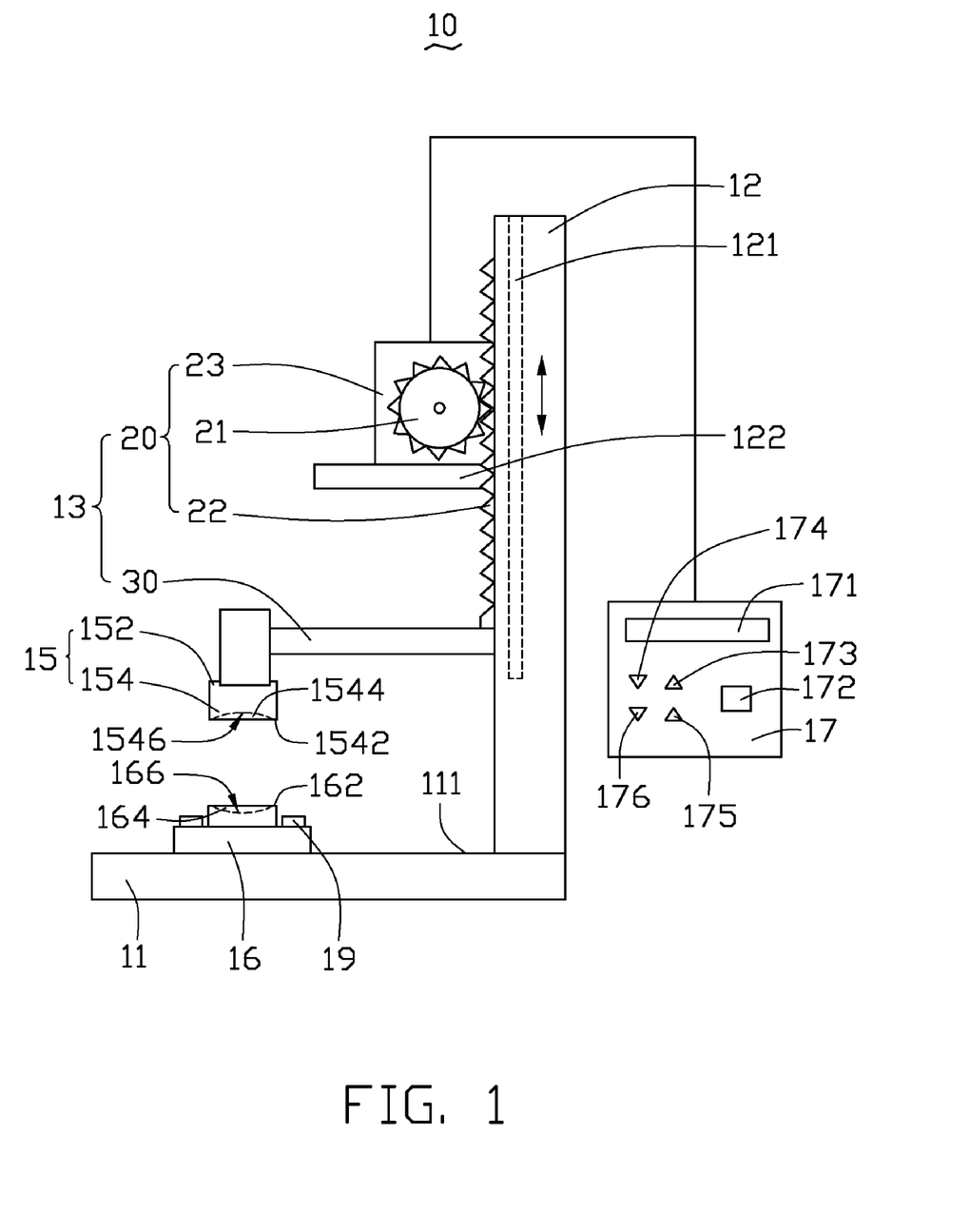
FIG. 1 is a schematic, side view of an apparatus for measuring a thickness of a lens according to an exemplary embodiment, the apparatus including first and second touch heads.
Figure 2:
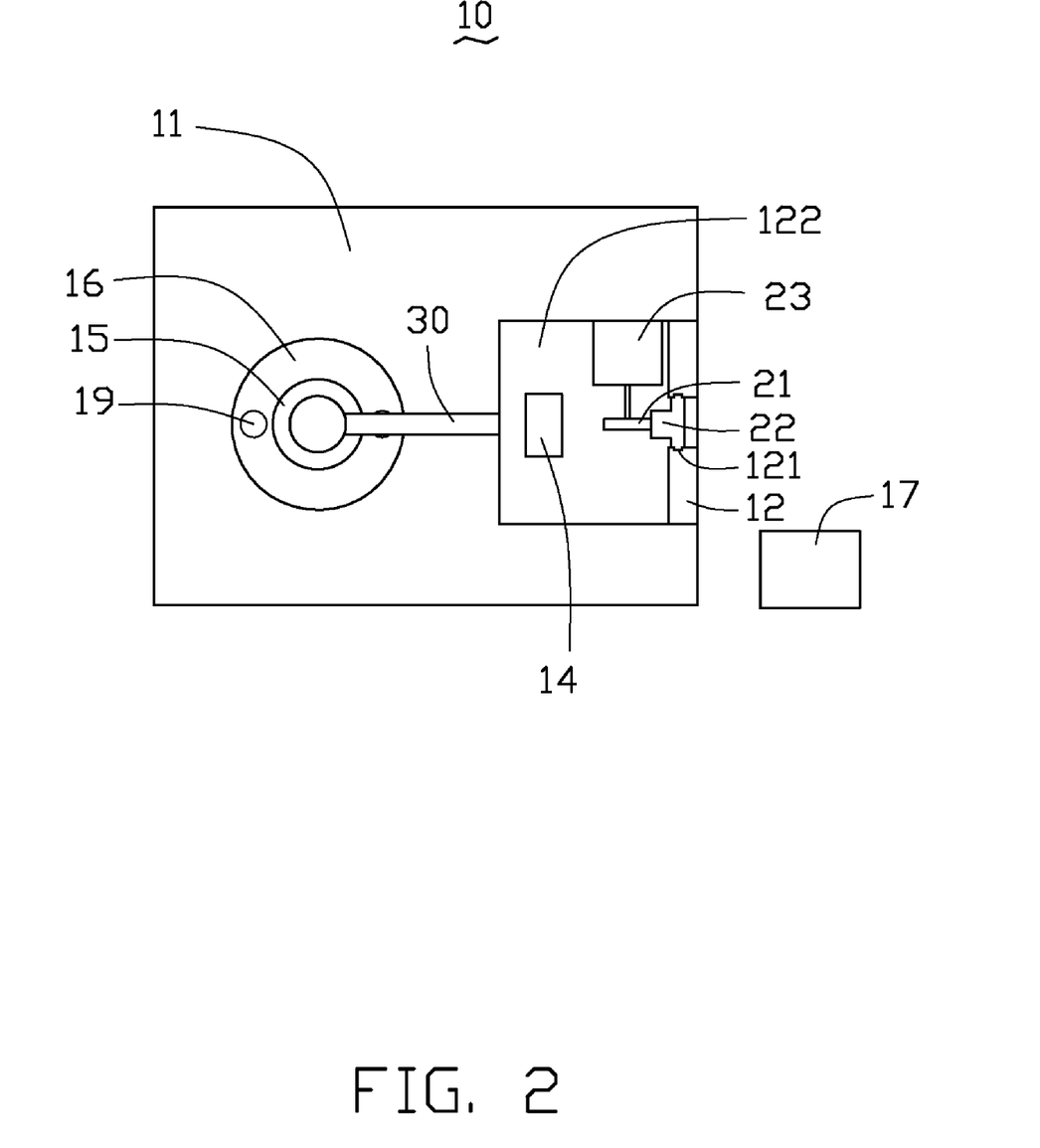
FIG. 2 a schematic, top view of the apparatus in FIG. 1.
Figure 3:
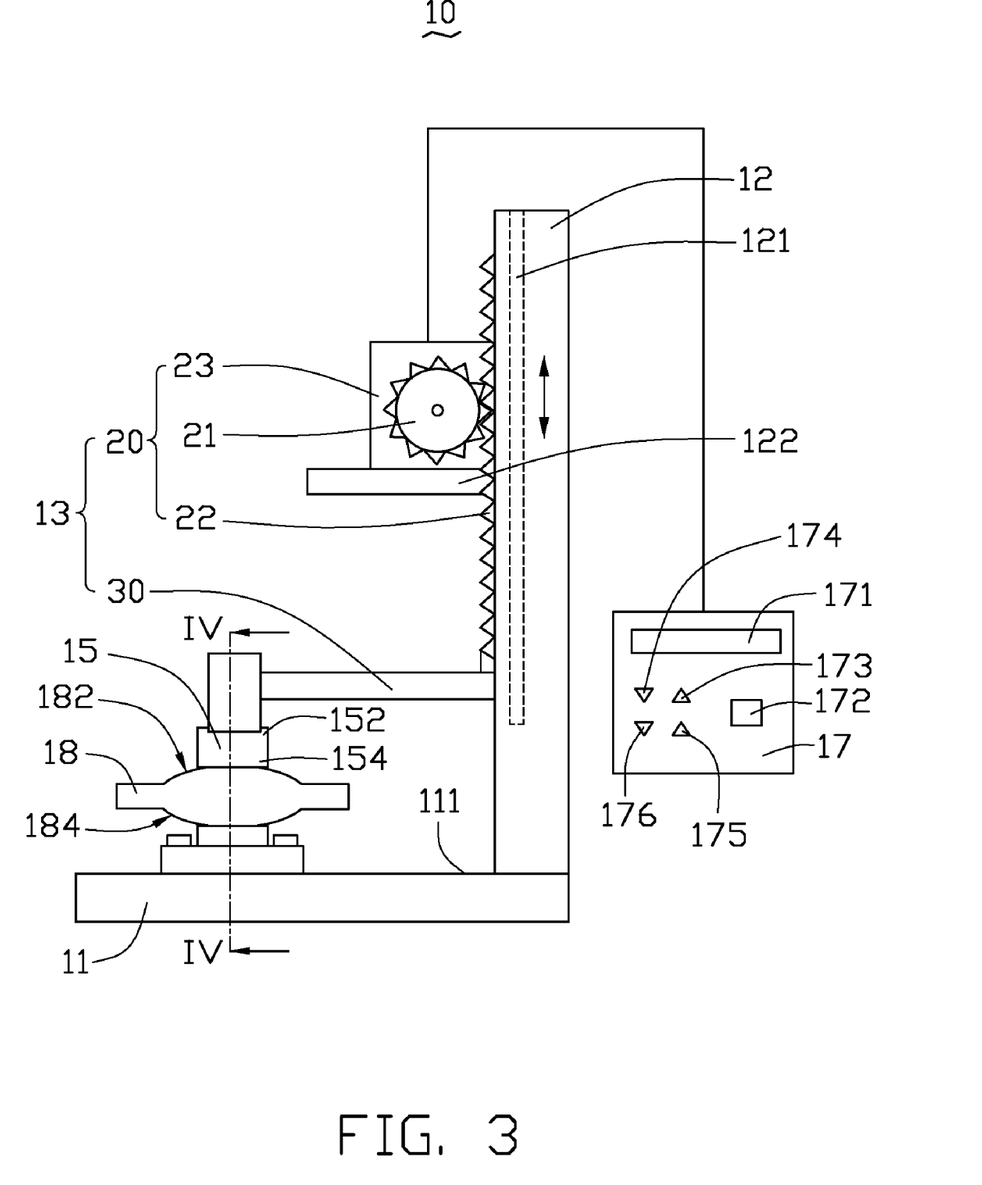
FIG. 3 is a schematic, side view of the apparatus in FIG. 1 in use.

Referring to FIGS. 1 to 3, an apparatus 10 for measuring a thickness of a lens 18 is provided in accordance with a first present embodiment. In the present embodiment, the lens 18 is a biconvex lens with two surfaces 182 and 184 facing away from each other. The thickness of the lens 18 is the distance between the centers of the two surfaces 182 and 184. Generally, the center of the surface of the biconvex lens is the peak point thereof. The apparatus 10 includes a base 11, a support member 12 and a control unit 17. The support member 12 is attached perpendicularly to the base 11. The apparatus 10 further includes a driving mechanism 13 and a first touch head 15. The driving mechanism 13 is mounted on the support member 12. The first touch head 15 is connected with the driving mechanism 13. The second touch head 16 is disposed on the base 11. The control unit 17 is electrically connected to the driving mechanism 13.

The base 11 has a support surface 111. A second touch head 16 is disposed on the support surface 111. A sliding rail 121 is mounted on the support member 12. An extending direction of the sliding rail 121 is perpendicular to the support surface 111. A fastening panel 122 protrudes from the exterior of the support member 12.

The driving mechanism 13 includes a driving device 20 and a driven member 30. The driving device 20 includes a gear 21, a rack 22 and a motor 23. The gear 21 is fixed to the motor 23. The motor 23 is configured for driving the gear 21 to rotate. The motor 23 and the gear 21 are fastened on the fastening panel 122. The rack 22 has two opposite sides, one of which meshes with the gear 21 and the other is slidably attached to the sliding rail 121. The driven member 30 is attached to one end of the rack 22. In use, the motor 23 rotates the gear 21, and then the rotating gear 21 drives the rack 22 to slide on the sliding rail 121. Thus the driven member 30 is driven up-and-down.

The control unit 17 includes a control chip (not shown), a display member 171, and a plurality of buttons. The control chip is configured for controlling a rotational velocity of the gear 23, and measuring a moving distance of the rack 22 and transmitting a value of the moving distance to be shown on the display 171. For each rotation of the gear 21, the rack 22 will move a distance equal to a perimeter of the gear 21. Therefore, the distance that the rack 22 moves can be obtained via a product of the amount that the gear 21 rotates and the perimeter of the gear 21. The plurality of buttons includes a return-to-zero button 172, a slow rise button 173, a slow lower button 174, a quick rise button 175 and a quick lower button 176. Pressing the return-to-zero button 172 can make the display member 171 show a value of zero. Pressing the slow rise button 173, the slow lower button 174, the quick rise button 175 and the quick lower button 176 can make the driven member 30 to have a slow rise, a slow lower, a quick rise and a quick lower movement respectively.

One end 152 of the first touch head 15 is detachably connected to the driven member 30, thus the first touch head 15 can move towards or away from the base 11 along with the driven member 30. In the present embodiment, the first touch head 15 is threadedly connected to the driven member 30. The other end 154 of the first touch head 15 is set facing towards the second touch head 16.

The second touch head 16 is disposed on the support surface 111 and also detachably connected to the base 11. In practical use, the second touch head 16 may be exchanged with other touch heads according to the shape of the lens to be measured. In the present embodiment, the second touch head 16 is fastened on the support surface 111 via bolts 19.

The end 154 of the first touch head 15 has a first end surface 1542 facing towards the second touch head 16. The second touch head 16 has a second end surface 162 facing towards the first end surface 1542. A first recess 1544 and a second recess 164 are defined on the first end surface 1542 and a second end surface 162, respectively. The first recess 1544 and the second recess 164 have a first contact surface 1546 and a second contact surface 166 respectively facing towards each other. The first contact surface 1546 has a shape same with part of the surface 182 of the lens 18, and the second contact surface 166 has a shape same with part of the surface 184 of the lens 18. The first contact surface 1546 and second contact surface 166 are configured for tightly contacting with the surfaces 182 and 184 of the lens 18 respectively, and the center of the first contact surface 1546 and the center of the second contact surface 166 correspond to the center of the surface 182 and the center of the surface 184 respectively. Also, the first contact surface 1546 and the second contact surface 166 may conform to the shapes of the entire surface 182 and the entire surface 184 respectively.

Figure 4:
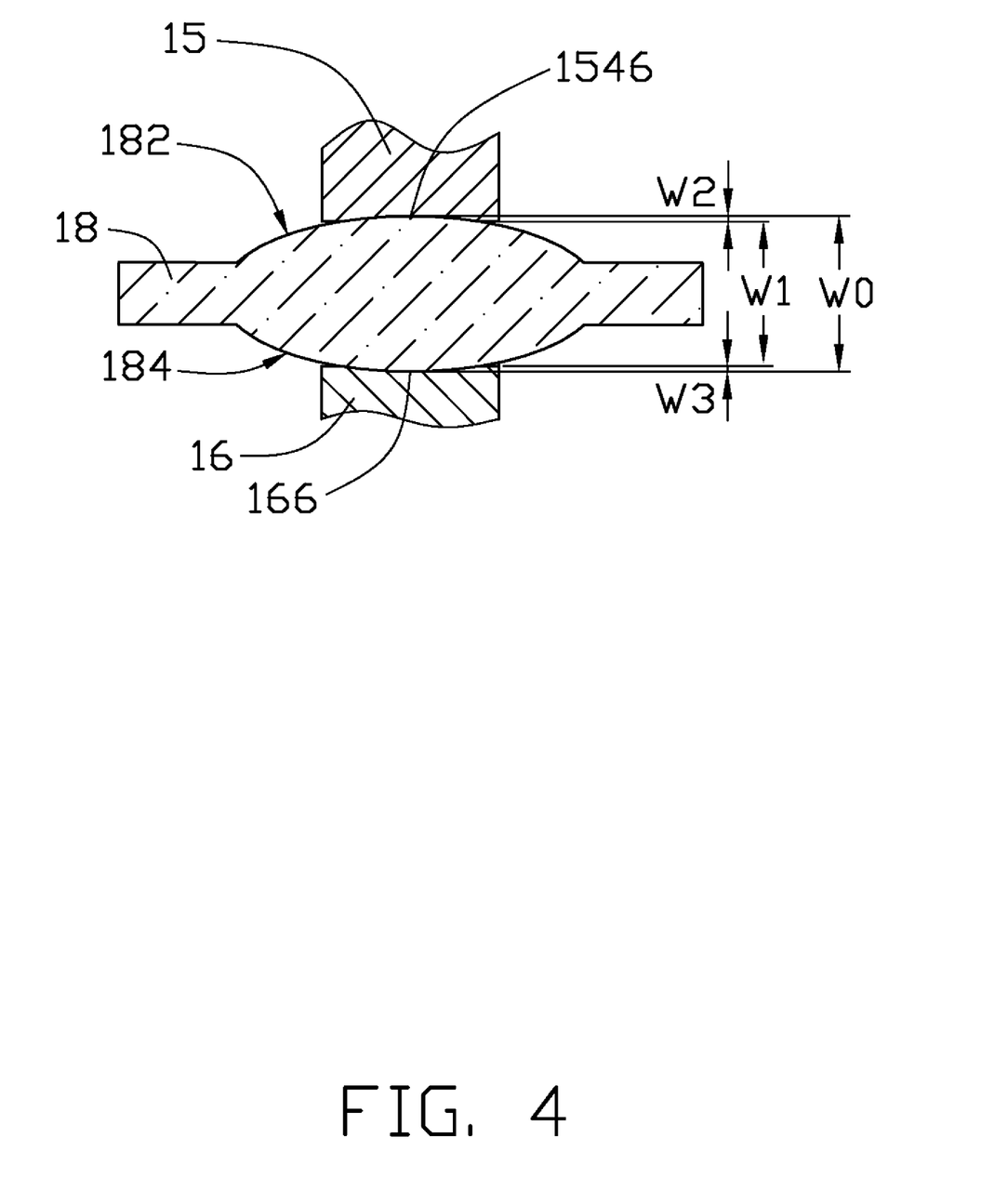
FIG. 4 is a cross-sectional view taken along line IV-IV of FIG. 3, showing the first and second touch heads touching the lens.
Figure 5:
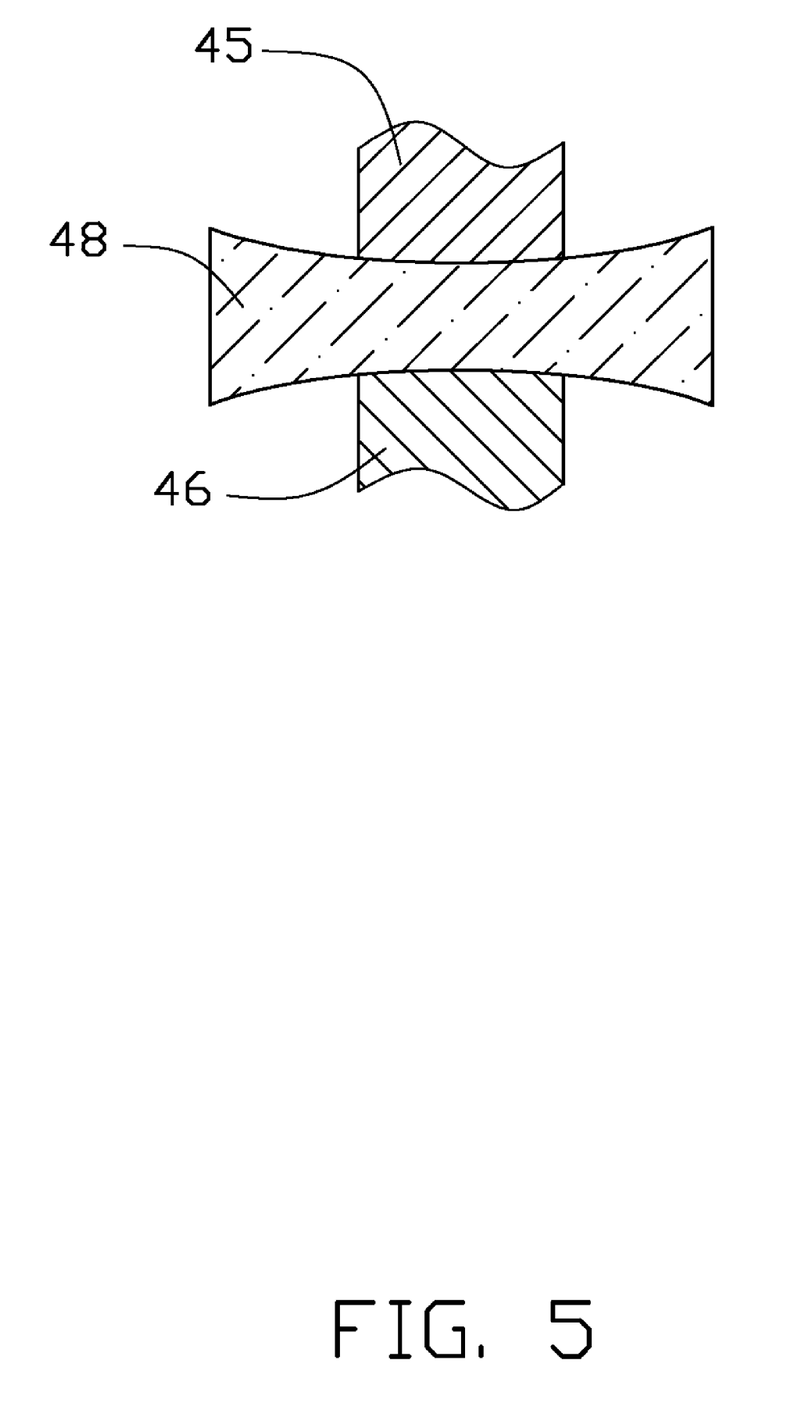
FIG. 5 is a cross-sectional view of two touch heads touching another lens in accordance with a second embodiment.

Referring to FIG. 4, when measuring a thickness of the lens 18 using the apparatus 10, the first contact surface 1546 and the second contact surface 166 contact with the two surfaces 182 and 184 of the lens 118 respectively. At that moment, a distance between the first end surface 1542 and the second end surface 162 is defined as W1. A distance between the center of the first contact surface 1546 and the first end surface 1542 is defined as W2. A distance between the second contact surface 166 and the second end surface 162 is defined as W3. Then a thickness of the lens 18 W0 is obtained via the following function:

$$W0=W1+W2+W3. \tag{I}$$

The parameters of the first contact surface 1546 and the second contact surface 166 are obtained from the original design parameters of the two surfaces 182 and 184 of the lens respectively. The first contact surface 1546 and the second contact surface 166 can be formed via an ultraprecision machining method. Values of W2 and W3 can be obtained via measuring after the first contact surface 1546 and the second contact surface 166 are finished.

Referring to FIGS. 1 to 4, a method for measuring a thickness of the lens using the apparatus 10 is described in detail as following:

Step (1): The first touch head 15 is controlled to move toward the second touch head 16 till the first end surface 1542 contacts the second end surface 162. The first touch head 15 is driven according to activation of the slow lower button 174 or quick lower button 176 of the control unit 17. The return-to-zero button 172 is pressed, then the value shown on the display member 171 is adjusted to zero.

Step (2): The slow rise button 173 or the quick rise button 175 is pressed to make the first touch head 15 move apart from of the second touch head 16. The lens 18 is disposed on the second touch head 16, wherein the second contact surface 166 is in tight contact with the surface 184 of the lens 18.

Step (3): The slow lower button 174 or the quick lower button 176 is pressed to make the first touch head 15 move toward the lens 18 till the first contact surface 1542 is in tight contact with the surface 182 of the lens 18. At that moment, the reading value of the display member 171 is the distance W1. The distances W2 and W3 are measured before Step (1). Then the thickness W0 of the lens 18 is obtained via substituting the values of W1, W2 and W3 to the function (I).

According to the present embodiment, the large contact surface area between the surfaces 1546, 166 and the surfaces 182, 184 of the lens 18, bending of the lens 18 is less likely to occur during the measuring process, thus yielding more reliable results. In addition, the first and second touch heads 15 and 16 are detachable, thus can be exchanged with other touch heads to correspond to the shape of the lens to be measured.

Referring to FIG. 7, a first touch head 45 and second touch head 46 are illustrated in accordance with a second exemplary embodiment. The first touch head 45 has a first contact surface (not labeled). The second touch head 46 has a second contact surface (not labeled) facing towards the first contact surface of the first touch head 45. The first contact surface and the second contact surface are both convexity and configured for contact closely with two surfaces of a biconcave lens 48. The first contact surface and the second contact surface have shapes of part of the two surfaces of the lens 48 respectively. At that moment, the reading value of the display member 171 is a thickness of the lens 48.

It is to be understood that the apparatus of the invention can also be used to measure lenses with other shapes, e.g. a lens with a wave shape, as long as the first touch head and the second head have the first contact surface and the second contact surfaces with shapes the corresponding to the surfaces of the lens respectively.

It is understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An apparatus for measuring a thickness of a lens, the lens having a first surface and a second surface facing away from the first surface, the apparatus comprising:
   a plurality of first touch heads each having a first curved contact surface for coming into contact with the first surface of the lens, the first curved contact surfaces of the first touch heads having different curvatures for being selectively mated with the first surface of the lens;
   a base for selectively mounting one of the first touch heads thereon;
   a plurality of second touch heads each having a second curved contact surface for coming into contact with the second surface of the lens, the second curved contact surfaces of the second touch heads having different curvatures for being selectively mated with the second surface of the lens;
   a driving mechanism for selectively mounting one of the second touch heads thereon, the driving mechanism configured for driving the mounted second touch head to move relative to the mounted first touch head, the second curved contact surface of the mounted second touch head facing toward the first curved contact surface of the mounted first touch head.

2. The apparatus as described in claim 1, further comprising a support member mounted on the base, and a control unit electrically connected with the driving mechanism, the driving mechanism mounted on the support member, the control unit being configured for controlling the driving mechanism and measuring a distance between the first and second mounted touch head.

3. The apparatus as described in claim 2, wherein each of the first touch heads is selectively mountable on the driving mechanism.

4. The apparatus as described in claim 2, wherein each of the second touch heads is selectively mountable on the base.

5. The apparatus as described in claim 2, wherein the driving mechanism comprises a driving device and a driven member connected to the driving device, the driving device being configured for driving the driven member to move up-and-down, the driven member being connected to the mounted first touch head.

6. The apparatus as described in claim 5, wherein the driving device comprises a gear, a motor connected to the gear and a rack meshing with the gear, the apparatus further comprising a sliding rail mounted on the support member, the sliding rail extending along a direction perpendicular to the surface of the base, the gear being driven by the motor and the rack being driven to slide on the sliding rail by the gear.

7. The apparatus as described in claim 6, wherein the control unit is configured for controlling a rotation of the gear and measuring the thickness of the lens based on the rotational movement of the gear.

* * * * *